June 15, 1926.
H. C. LORD
RESILIENT WHEEL
Filed April 11, 1921
1,588,481
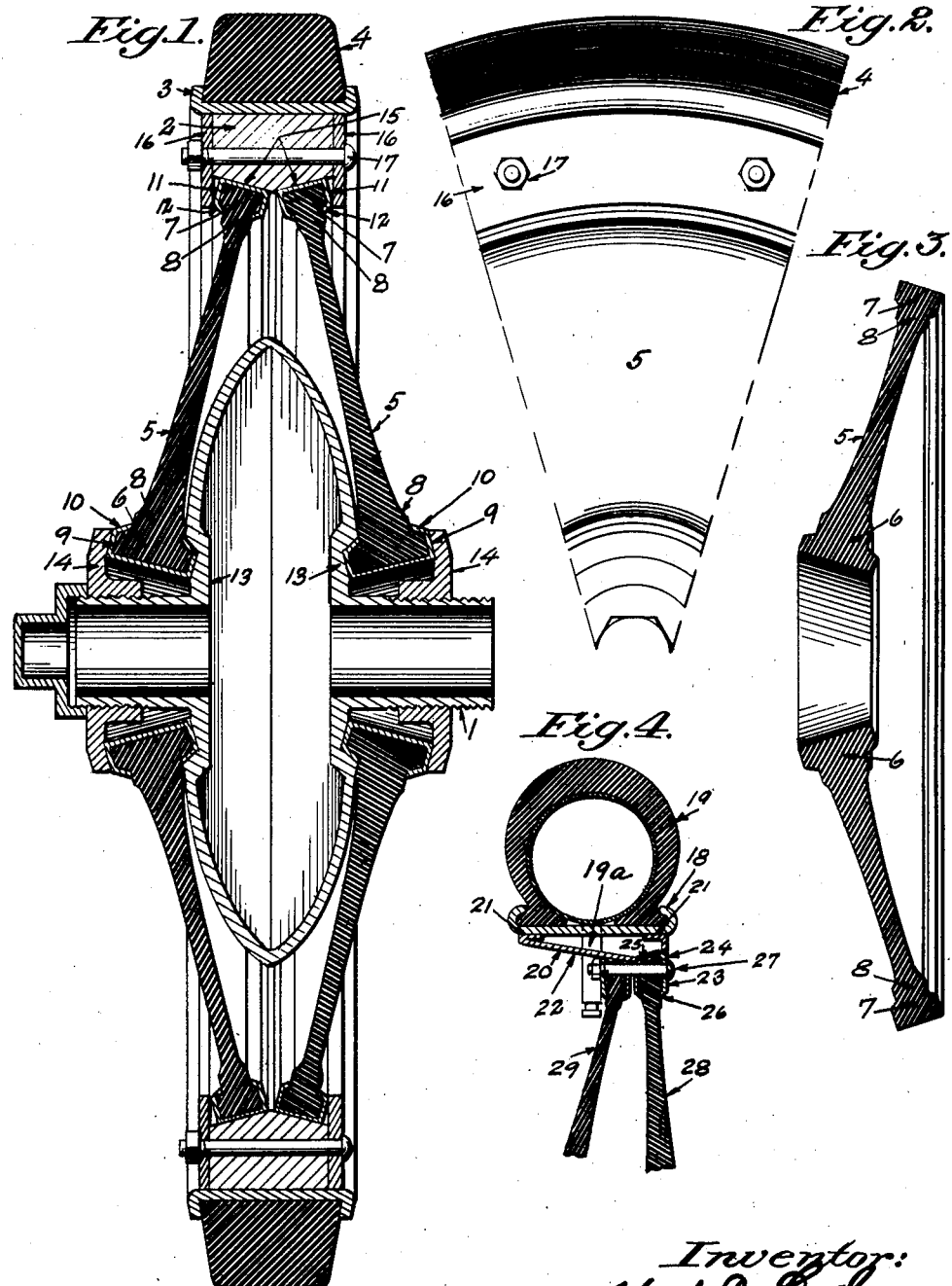
Inventor:
Hugh C. Lord Patented June 15, 1926.

1,588,481

UNITED STATES PATENT OFFICE.

HUGH C. LORD, OF ERIE, PENNSYLVANIA.

RESILIENT WHEEL.

Application filed April 11, 1921. Serial No. 460,379.

This invention relates to resilient wheels formed by interposing between the hub portion and the rim portion of the wheel a resilient disc, preferably of rubber, said disc being initially expanded. In an application #448,136, filed by me Feb. 26th, 1921, I have shown such a wheel. It may be desirable to replace the rubber discs of such a wheel and where this is necessary the difficulty of expanding a rubber disc by the ordinary user is considerable. The present invention provides such discs with rings which hold the disc in expanded condition so that it may be readily applied. The invention also contemplates the use of two discs, one of greater strength than the other so as to off-set the wheel slightly. It also contemplates a rim attachment off-set particularly for use with pneumatic tires.

The invention is illustrated in the accompanying drawings as follows:—

Fig. 1 shows a central section of the wheel.

Fig. 2 a side elevation of a segment of a wheel.

Fig. 3 a section of one of the rubber discs.

Fig. 4 a section of a rim and discs showing the preferred form.

1 marks the hub, 2 the felloe which in the construction shown in Fig. 1 is of wood, 3 a tire rim, and 4 a tire. The rubber discs 5 have the shouldered beads 6 along their inner peripheries and shouldered beads 7 along their outer peripheries. Slightly thickened portions 8 lead from the beads to the expanding or intermediate portion. The intermediate or expanding portion of the disc is preferably so graduated in thickness that the areas of annular cross sections are equal so that there is the same mass of rubber sustaining the load at the hub as near the periphery.

A metal ring 9 of channel shape envelops the bead 6, the lips 10 being pressed downwardly over the outer shoulders of the bead 6. A similar ring 11 of channel shape envelops the outer bead 7, the ring having the inwardly extending lip 12 engaging the shoulder of the bead. In forming these rings they are rolled with the sides slightly open so that the bead may be inserted and are pressed down to position. In forming the discs the central ring 9 is put in place. The rubber of the disc is then expanded, the outer ring put in place and compressed on the bead. The element can then be shipped and can be readily attached to a wheel where it is desirable to assemble such a wheel or to renew such a disc.

The inner ring 9 is clamped between the flange 13 and flange 14 on the hub. The felloe 2 has the opposing tapered surfaces 15 which are engaged by the outer peripheries of the rings 11 and the rings 11 are crowded on to the tapered surfaces by the plates 16 under the action of the bolts 17.

In the construction shown in Fig. 4 the rim 18 is adapted to hold a pneumatic tire 19. A metal felloe 20 has the inwardly extending lips 21 which support the rim 18 and the inner periphery has the tapered surfaces 22, the opposing surfaces intercepting at one side of the center of the felloe so as to make clearance for the inflation tube 19$^a$. The rings 23 have the side walls 24 which are arranged in parallel relation and extend radially, the outer walls 25 being inclined to the side walls so as to conform to the tapered surfaces 22. The lips 26 are so arranged relatively to each other as to be directly opposed at opposite sides of the shoulder on the bead of the discs. The rings 23 are drawn up on the tapered surfaces by bolts 27 which extend directly through the rings and through the rubber, the rubber sealing the opening around the bolts. The discs 28 and 29 of this construction are of slightly different strengths so that the disc 28 being of greater strength draws the disc 29 toward it and in consequence off-sets the peripheries of the discs relatively to the hub and that part of the rim to which the discs are attached. The proportioning of the rubber discs should be similar to that heretofore described, that is, the thickness of the rubber should increase toward the hub and the discs are expanded and held by the expansion rings as described.

What I claim as new is:—

1. In a wheel, the combination of a hub member; a rim member; a rubber disc joining said members; an expansion ring secured to the outer periphery of the rubber disc and holding it distended; and means for securing the ring to the rim member.

2. In a wheel, the combination of a hub member; a rim member; a rubber disc joining said members; a ring securing the inner periphery of the disc, a ring securing the outer periphery of the disc extended; and means for securing said rings to the rim and hub members.

3. In a wheel, the combination of a hub member; a rim member having opposing tapered surfaces; two rubber discs joining the hub and rim members, rings arranged on the outer peripheries of the rubber discs and holding them distended; and means for clamping said rings against said tapered surfaces.

4. In a wheel, the combination of a hub member; a rim member having opposing tapered surfaces; two rubber discs joining the hub and rim members, rings arranged on the outer peripheries of the rubber discs and holding them distended; and bolts extending through the rings for clamping said rings against said tapered surfaces.

5. In a wheel, the combination of a hub member; a rim member; two rubber discs joining said members, said discs having peripheral beads; metal rings secured to the outer peripheries of said discs, said rings being of channel form with their sides parallel and laterally disposed and having lips engaging said beads; and means for securing said rings to the rim member.

6. In a wheel, the combination of a hub member; a rim member, said rim member having opposing tapered surfaces; two rubber discs joining said members, said discs having peripheral beads; metal rings secured to the outer peripheries of said discs, said rings being of channel form with their sides parallel and laterally disposed and having lips engaging said beads; and means for clamping the rings against said tapered surfaces.

7. In a wheel, the combination of a hub member; a rim member; two rubber discs connecting the hub and rim members; and means for securing under tension the outer peripheries of the discs to the rim member, said means offsetting the outer peripheries of the discs on the rim member relatively thereto and relatively to the hub member.

8. In a wheel, the combination of a hub member; a rim member; and two rubber discs joining said members, said discs being under tension and inclined to each other, one of said discs being of greater strength than the other.

9. A resilient element for a wheel comprising a rubber disc; and a ring adapted to be secured to a wheel and to the outer periphery of the disc and holding the disc distended.

10. A resilient element comprising a rubber disc; a metal ring adapted to be secured to a wheel rim and to the outer periphery of the disc and holding the disc extended; and a metal ring secured to the inner periphery of the disc and adapted to be secured to a wheel hub.

11. A resilient wheel element comprising a rubber disc having a bead on its outer periphery; and a channel shaped ring enveloping the bead and having lips engaging the bead, said ring holding the disc distended.

In testimony whereof I have hereunto set my hand.

HUGH C. LORD.